United States Patent [19]

Park et al.

[11] Patent Number: 4,911,976

[45] Date of Patent: Mar. 27, 1990

[54] HEAT-SEALABLE MULTI-LAYER FILM STRUCTURE SAME

[75] Inventors: Hee C. Park, Fairport; A. Michael Nahmias, Victor, both of N.Y.

[73] Assignee: Mobil Oil Corp., New York, N.Y.

[21] Appl. No.: 320,804

[22] Filed: Mar. 8, 1989

Related U.S. Application Data

[63] Continuation of Ser. No. 671,376, Nov. 14, 1984, abandoned.

[51] Int. Cl.$^4$ ............................................. B32B 27/08
[52] U.S. Cl. .................................... 428/216; 428/331; 428/451; 428/516; 428/910; 525/240; 264/176.1
[58] Field of Search ............... 428/216, 910, 516, 451, 428/331

[56] References Cited

U.S. PATENT DOCUMENTS

| | | | |
|---|---|---|---|
| 3,508,944 | 4/1970 | Henderson | 428/516 |
| 4,147,827 | 4/1979 | Breidt, Jr. et al. | 428/218 |
| 4,348,457 | 9/1982 | Rosenthal et al. | 428/349 |
| 4,419,410 | 12/1983 | Weiner | 428/516 |
| 4,419,411 | 12/1983 | Park | 428/516 |
| 4,439,478 | 3/1984 | Fergurson et al. | 428/516 |
| 4,716,068 | 12/1987 | Seifried et al. | 428/516 |

*Primary Examiner*—P. C. Ives
*Attorney, Agent, or Firm*—Alexander J. McKillop; Charles J. Speciale; James P. O'Sullivan, Sr.

[57] ABSTRACT

A multi-layer structure of low COF also having antistick characteristics over a wide temperature range during heat-sealing, comprising an amine containing polypropylene core layer having one or more skin layers of a low stereoregularity polyolefin containing, silica and a polysiloxane and a method of forming the same.

10 Claims, No Drawings

HEAT-SEALABLE MULTI-LAYER FILM STRUCTURE SAME

This is a continuation of application Ser. No. 671,376, filed on Nov. 14, 1984, now abandoned.

BACKGROUND OF THE INVENTION

This invention relates to a multi-layer heat-sealable structure which has exceptionally low film to film coefficient of friction over a wide temperature range and which, when used to wrap packages secured by a heat-seal layer or layers, avoids package to package sticking in any heat seal region.

Highly crystalline polypropylene film is an excellent packaging material, but it has high film to film coefficient of friction which makes it difficult to utilize in automatic packaging equipment. This material in film form has a tendency to stick at heat seal surfaces when adjacent heat seal regions contact shortly after sealing. Some years ago cigarette packaging machines had a top speed of approximately 140 packs per minute. Present day machines run at from 300-400 packs per minute, which is equivalent to approximately 160 ft. of film per minute. This speed makes the handleability or machineability of film, i.e. the ability of the film to be machine utilized, very critical. Film breakage or partial tearing and package to package sticking causes extremely expensive machine down time which cannot be tolerated.

Certain innovations have improved on the surface friction characteristics of highly crystalline polypropylene in film form. For example, in U.S. Pat. No. 3,176,021, incorporated herein by reference in its entirety, it is taught to include minor quantities of fatty acid amides into the polypropylene. In order to obtain the benefits taught by this patent, certain limitations must be observed. The film must be formed from a melt, extruded at a temperature between about 400°-550° F. In addition, the amide must be present in from 0.005 to about 2.0 weight percent of the polypropylene and it must be present along with from about 0.1 to about 4.0 weight percent polyethylene. Under these conditions and limitations the resulting polypropylene film will have a static coefficient of friction no higher than 0.6 which is significantly higher than present day requirements. In addition, such a film does not have the high stereoregularity required by present day packaging demands. Further, it has been found that once said film has been subjected to the high temperatures which will be experienced in practice, particularly during heat sealing, i.e., approaching 270° F., the coefficient of friction increases significantly and is nowhere near the present day requirements of 0.25.

In U.S. Pat. No. 3,399,156, incorporated herein by reference in its entirety, it is taught that the inclusion of the combination of silicone oil and finely divided silica into a polypropylene film produces a film which will have a coefficient of friction of from 0.45 to 0.46 and be suitable for use in bread-wrapping machines. This is not a low enough co-efficient of friction for use in present day, high speed automatic packaging machinery.

It has been found that to a certain extent high crystallinity in polypropylene impedes facile migration of additives to the surface of such a polymer in film form. This problem has been addressed in U.S. Pat. No. 4,419,410, incorporated herein by reference in its entirety. This application teaches that by the coextrusion of a skin layer of polypropylene of comparatively low stereoregularity with a core layer of polypropylene of comparatively high stereoregularity, where this core layer contains a surface modifying agent such as an amide of a fatty acid, the amide will bloom to the surface of the comparatively low stereoregularity polymer with comparative ease.

In spite of these teachings, it remained until U.S. Pat. No. 4,419,411, incorporated herein by reference in its entirety, to significantly advance the art of making multi-layer polypropylene films suitable for most high speed packaging operations. This patent teaches a multi-layer polypropylene film structure having surface modifying agents comprising finely divided silica, silicone oil and an amide of a water insoluble mono-carboxylic acid having from about 8 to about 24 carbon atoms on a surface thereof.

Notwithstanding the general excellence of this film, it is found that when used in high speed cigarette package wrapping machines, there is a tendency for the film surfaces of contacting packages to stick together, particularly in the areas where heat sealing has occurred.

It is an object of the present invention to provide a multi-layer film structure having at least one surface layer having an extremely low coefficient of friction over a wide temperature range, said film also having reduced tendency of the film surfaces to stick together when used in high speed packaging machinery.

It is another object to provide a process for preparing this multi-layer structure.

SUMMARY OF THE INVENTION

It has been discovered that by the inclusion of a combination of additives into the skin layer or layers of the subject structure and by maintaining the thickness of the skin layer or layers at a particular minimum, a multi-layer film of low COF and non-sticking characteristics is obtained.

The present invention is directed to an oriented multi-layer film structure comprising coextruded layers of:

(a) a base layer comprising polypropylene of comparatively high stereo-regularity and from about 0.05-0.2 wt. % of the base layer of a long chain aliphatic tertiary amine; and (b) a heat-sealable skin layer comprising a polyolefin of comparatively low stereo-regularity on at least one surface of (a), said skin layer containing a combination of finely divided silica, and a silicone oil; said skin layer being of a thickness less than about 0.8 microns; and the surface of (b) having bloomed thereon at least some of the amine of (a).

The present invention also is directed to a process for preparing the above-identified oriented film structure comprising melt coextruding a combination of:

(a) a base layer comprising polypropylene of comparatively high stereoregularity; containing from about 0.05-0.2 wt. % of the base layer of a long chain aliphatic tertiary amine; and (b) a skin layer comprising a polyolefin of a comparatively low stereoregularity on at least one surface of (a), said skin layer containing a combination of finely divided silica and a silicone oil; said skin layer being of a thickness less than about 0.8 microns; and orienting the structure.

DESCRIPTION OF THE INVENTION

The present invention is broadly directed to the improvement of the surface characteristics of a multi-layer structure, the core layer of which is highly crystalline or highly stereoregular polypropylene in oriented film form. The preferred polypropylenes are well known in the art and are formed by polymerizing propylene in the presence of stereospecific catalyst systems. They can have a melt flow rate at 446° F. ranging from about 1 to about 25, preferably 2 to 4. The crystalline melting point is about 321°–325° F. The number average molecular weight ranges from about 25,000 to about 100,000. The density ranges from about 0.90 to 0.91.

Included in the core layer, is a long chain aliphatic tertiary amine, for example, one of the general formula: $R_3N$. One of the R groups is a fatty acid residue or its $C_{12}$–$C_{18}$ alkyl equivalent. The others are hydroxy $C_1$–$C_4$ alkyl groups. Examples of such compounds include N,N-bis(2-hydroxyethyl)tallow amine, wherein the tallow group is believed to include a mixture of $C_{14}$–$C_{18}$ alkyl groups. The long chain alkyl groups can also be obtained as mixtures from, for example, coconut oil, fatty acids, and the like. The low molecular weight hydroxy alkyl group can be hydroxyethyl, hydroxypropyl, hydroxybutyl, etc.

The amine can be dry blended together with the polypropylene resin and then melt mixed. Alternatively, the amine can be incorporated into a minor portion of the polypropylene as a master batch to form a high concentration mix of the amine and the polypropylene. This may then be diluted to the appropriate proportion by the addition of more polypropylene. Some of these amines are known anti-static agents, however, they are employed herein in order to reduce the coefficient of friction of the final film structure and to inhibit package to package sticking. While the amine is added to the core resin, when the core resin is coextruded with a skin polymer some portion of the amine enters into and moves to the surface of the skin layer. Thus, by this mechanism the amine is available at the surface of the skin layer or layers so as to beneficially effect, in combination with the silica and siloxane, the coefficient of friction and anti-stick characteristics.

The comparatively low stereoregular polyolefin polymers contemplated as the skin materials of the multi-layer system include, for example, random co-polymers of ethylene and propylene and ethylene-propylene-butene-1 copolymers. Particularly preferred are the ethylene-propylene copolymers which contain from about 2 to about 7 wt. % and, more preferably, from 3–5 wt. % ethylene. They can have a melt flow rate at 446° F. ranging from about 2 to 15 and preferably 3 to 8. The crystalline melting point is about 257°. to 302° F. The number average molecular weight range is from about 25,000 to about 100,000. The density ranges from about 0.89 to 0.90. These copolymers have excellent heat seal characteristics. They do not, however, have the excellent physical characteristics inherent in the polypropylene of comparatively high stereoregularity. Thus, the core material of polypropylene of high stereoregularity possesses the excellent characteristics of good moisture barrier, stiffness, high strength, good optical properties. The thin co-extruded surface layer of the comparatively low stereoregular ethylene-propylene random copolymer provides excellent heat seal characteristics. In order to take advantage of the excellent heat seal characteristics of this skin layer, the skin film must be modified so as to exhibit the characteristics of good slip and the tendency not to stick to an adjacent film region after being exposed to heat-seal temperatures.

The overall thickness of the contemplated multi-layer structure is primarily of the highly stereoregular polypropylene. The coextruded layer of comparatively low stereoregularity may be present on one or both surfaces of the core layer. It is preferred that the skin layer be on both sides of the core layer and it is critical that the thickness of each skin be less than 0.8 microns. So long as the continuity of the film is maintained, its minimum thickness is not important. Present day techniques will easily result in a film thickness of about 0.3. In time, continuous layers of less than 0.3 microns will be possible.

The present invention is based upon the discovery that the combination of the three surface modifying agents, i.e. the silica, the silicone oil, and the amine by virtue of its transport and blooming onto the surface of the skin layer, are unexpectedly superior, than the individual agents or any combination of less than all of the agents when the film thickness is less than 0.8 microns. These limitations are effective when the film is used in high speed machines and the film undergoes heat-sealing.

The silica can be any commercially available finely divided silica, preferably that having a mean particle size ranging from about 0.5 to 5 microns. One commercially available silica has a mean particle size of 0.75 microns and another has a mean particle size of 4.5 microns. Either material can be employed. The silica can be present in from about 0.05 to 0.5 wt. %, preferably about 0.1 to 0.3 wt. % of the skin layer.

The silicone oil, preferably is a poly-dimethylsiloxane, having a viscosity of about 20,000 to 3,000,000, preferably 20,000 to 30,000 centistokes. This siloxane can be present in from about 0.3 to 0.8 wt. % of the skin layer.

An optional and preferred modifying agent for use herein is an amide of a water-insoluble monocarboxylic acid having about 8 to about 24 carbon atoms and mixtures of said amides. Specific examples of this class of amides are erucamide, oleamide, stearamide, behenamide, etc. It is preferred that this additive be included in the highly stereoregular core polypropylene in an amount of about 300 to 400 parts per million of the core layer and/or in the skin layer in an amount up to about 2,000 ppm. It is to be understood that the amide slip agent may be provided in the comparatively low stereoregular copolymer by dispersing the amide in the resin precursor of the comparatively high stereoregular polypropylene alone, the amide then extuding from the base or core film through the copolymer film to its surface. Thus, amide additive in the outer film resin starting material is not necessary, but may be desired.

The percentage of the surface modifying additives in the multi-layer structure should be such as to yield a coefficient of friction of the surface of the skin layer of 0.25. More particularly, the proportions should be such that the coefficient of friction of the surface of the skin layer or layers is about 0.25 at room temperature and is maintainable at less than 0.8 up to be 270° F.

To further aid the heat seal characteristics and improve the optical properties of the film, the skin layer can also contain up to 10 wt. % of a natural or synthetic terpene resin, a wax, or a low molecular weight (e.g. 10,000) polyethylene.

The multi-layer films of the present invention can be prepared employing commercially available systems for coextruding resins. The polypropylene homopolymer of comparatively high stereoregularity containing, if desired, amide slip agent, can be coextruded with an ethylene-propylene random copolymer of comparatively low stereoregularity containing the appropriate percentage of the combination of silica, dimethylsiloxane and imcompatible polymer dispersed therein. The polymers can be brought to the molten state and coextruded from a conventional extruder through a flat sheet die, the melt streams being combined in an adapter prior to being extruded from the die. After leaving the die orifice, the multi-layer film structure is chilled and the quenched sheet then reheated and stretched, e.g., 4 to 6 times in the machine direction (MD), and subsequently, for example, 4 to 10 times in the transverse direction (TD). The edges of the film can be trimmed and the film wound onto a core. It is preferred, particularly where the film contains an amide slip agent, that the thus formed structure be conditioned or equilibrated by holding the same for a period of about 6 hours to 1 week at a temperature from about 80° to about 125° F., especially preferred is a time from about 6 hrs. to about 72 hrs. at between 100°-125° F. This film will have on the surface thereof a combination of the four additives, amide, silica, silicon oil and the incompatible polymer. The resulting film will have a coefficient of friction of 0.25 or lower and will not block under conditions of tight winding after being held at temperatures up to 140° F.

Some commercially available core polymers, skin polymers and incompatible polymers and their at least approximate melting points are tabulated below:

TABLE

| Polymeric Material All Homopolypropylene | | Melting Point Range 321°-325° F. |
|---|---|---|
| ARCO W756 | (ethylene-propylene random copolymer 3.3-3.6 wt. % ethylene) | 273° F. |
| ARCO 827 | (ethylene-propylene random copolymer 4-8 wt. % ethylene) | 255° F. |
| Chisso XF 7500 | (ethylene-propylene-butene-1 terpolymer, 3.5 wt. % ethylene, 4.5 wt. % butene-1) | 266° F. |
| Chisso XF 7700 | (ethylene-propylene-butene-1 terpolymer, 5 wt. % ethylene, 4.5 wt. % butene-1) | 250° F. |
| Solvay KS 400 | (ethylene-propylene random copolymer) | 270° F. |
| Solvay KS 409 | (ethylene-propylene random copolymer 3.4-4.0 wt. % ethylene) | 270° F. |
| Sumitomo FL 6711 | (ethylene-propylene random copolymer, 4-6% ethylene) | 255° F. |

Coefficients of friction (COF) or slip may be determined by the "moving slide-stationary film" method of U.S. Pat. No. 3,399,156, incorporated herein by reference in its entirety.

The contemplated films can be tested by feeding a roll of film into a Scandia Model 712 Cigarette Pack Wrapping system with the capability of wrapping up to 200 packs of cigarettes per minute. This system is equipped with high percision controllers and a turn cage discharge. During transport through the system each pack is subjected to three heat seal regions which can cause package to package sticking together. The heat seal time is a fraction of a second. The film must maintain a COF at room temperature of between about 0.2-0.3 in order to avoid unacceptable drag which would lead to pack jamming and machine down-time. Success of the operation depends on the virtual absence of pack-to-pack sticking, a moderate to low force necessary to move the packs through the system and a seal range of at least 20° F. preferably 30°-40° F. on all seal surfaces.

EXAMPLES

EXAMPLE 1

A polypropylene homopolymer of comparatively high stereoregularity, i.e. Novamont 243.4A, containing about 1,000 ppm of N,N-bis(2-hydroxyethyl) tallow amine is melt coextruded with skin layers of Solvay KS 409, an ethylene-propylene copolymer having from about 3.4-4.0 wt. % ethylene, said copolymer containing 6,000 ppm of a poly-dimethylsiloxane, having a viscosity of 30,000 centistokes and 2,000 ppm silica of a mean particle size of about 1-2 micron. The resulting film has an overall thickness of 21 microns with the core layer being 19.8 microns and the skin layers being 0.6 microns each. Utilizing the above-described multilayer film, cigarette packages can be wrapped per the above-described process and apparatus at a rate of approximately 172 packs per minute. This wrapping can be successfully accomplished with a virtual absence of package-to-package sticking. A moderate to low force will be necessary to move the packages through the machine system. There will be a seal range of latitude of at least 20° C. on all seal surfaces.

EXAMPLE 2

Example 1 is repeated except the base polypropylene homopolymer is Novamont 243.4 which does not contain any amine.

This film when employed in the same cigarette package wrapping system described above will show an increase in drag force through the system of a value approximately 30%, that is, from a low to a moderate degree.

EXAMPLE 3

Example 1 is repeated except that the silica is excluded. Employing the resulting film in the same cigarette wrapping system, the system will jam in less than one minute due to package to package sticking and increased drag.

EXAMPLE 4

Example 1 is repeated except that the poly-dimethylsiloxane is excluded. Employing the resulting film in the same cigarette wrapping system, the system will jam in less than one minute due to package to package sticking and increased drag.

EXAMPLE 5

Example 1 is repeated except the thickness of the skin layer is 0.9 microns each.

This film when employed in the same cigarette package wrapping system described above will show excessive drag sufficient to cause jamming within a few seconds.

EXAMPLE 6

The amine-containing polypropylene homopolymer of comparatively high stereoregularity, i.e. Novamont 243.4A, is melt coextruded with skin layers of Chisso 7500, a terpolymer of ethylene-propylene-butene-1, said terpolymer containing approximately 800 parts per million of erucamide, 6,000 parts per million of a dimethylpolysiloxane, having a viscosity of 30,000 centistokes and 2,000 parts per million silica of amine particle size of from about 1-2 microns. The resulting film has an overall thickness of 21 microns with the core layer being 19.8 microns and the skin layers 0.5 microns each. Utilizing the above-described multilayer film, cigarette packages, can be wrapped per the above-described process and apparatus at a rate of approximately 172 packs per minute. This wrapping can be successfully accomplished with a virtual absence of package-to-package sticking. A moderate to low force will be necessary to move the packages through the machine system. There will be a seal range or latitude of at least 20° C. on all seal surfaces.

EXAMPLE 7

Example 6 is repeated except the amine is not present in the core layer polypropylene.

This film, when employed in the same cigarette package wrapping system described above, will show an increase in drag force through the system of about 30%.

EXAMPLE 8

Example 6 is repeated except that the silica is deleted from the skin layers. Employing the resulting film in the same cigarette package wrapping system described above, the system will jam within less than one minute due to package to package sticking and increased drag.

EXAMPLE 9

Example 6 is repeated except that the poly-dimethylsiloxane is deleted from the skin layers. Employing the resulting film in the same cigarette package wrapping system described above the system will jam within less than a minute due to package to package sticking and increased drag.

EXAMPLE 10

Example 6 is repeated except that the thickness of the skin layers was increased to 0.9 microns.

Employing the resulting film in the same cigarette wrapping system as described above, the system will jam within a few seconds due to package to package sticking and increased drag.

EXAMPLE 11

Example 6 is repeated except Chisso XF7700 is employed instead of Chisso XF7500 and the skin layers contain 8000 ppm of poly-dimethylsiloxane. The same degree of wrapping success and pack throughout will be experienced as in Example 6.

What is claimed is:

1. An oriented multi-layer film structure comprising coextruded layers of:

(a) a base layer comprising polypropylene of comparatively high stereoregularity and from 0.05-0.2 wt. % of the base layer of a long chain aliphatic tertiary amine; and (b) a heat-sealable skin layer comprising a polyolefin of comparatively low stereoregularity on at least one surface of (a), said skin layer containing a combination of finely divided silica and a silicone oil; said skin layer being of a thickness less than about 0.8 microns.

2. The structure of claim 1 wherein said amine is of the general formula $R_3N$, with one of the R groups being one or a mixture of $C_{12}$–$C_{18}$ alkyl groups and the others being hydroxy $C_1$–$C_4$ alkyl groups.

3. The structure of claim 2 wherein said polyolefin is either a random copolymer of propylene with ethylene or a copolymer of propylene with ethylene and butene-1.

4. The structure of claim 3 wherein said copolymer of propylene with ethylene contains from about 2 to 8 wt. % ethylene.

5. The structure of claim 3 wherein said copolymer of propylene with ethylene and butene-1 contains from about 3-6 wt. % ethylene and about 4-5 wt. % butene-1.

6. The structure of claim 3 wherein said silica has a mean particle size of from about 0.5 to 5 microns and is present in from about 0.05 to 0.5 wt. % of said skin layer.

7. The structure of claim 6 wherein said silicone oil is poly-dimethylsiloxane having a viscosity of about 20,000 to 3,000,000 centistokes, and is present in from about 0.3 to 0.8 wt. % of said skin layer.

8. The structure of claim 7 wherein said polymer of propylene with ethylene contains from about 2 to 8 wt. % ethylene.

9. The structure of claim 7 wherein said copolymer of propylene with ethylene and butene-1 contains from about 3-6 wt. % ethylene and about 4-5 wt. % butene-1.

10. An oriented multi-layer film structure comprising coextruded layers of:

(a) a base layer comprising polypropylene of comparatively high stereoregularity and from 0.05-0.2 wt. % of the base layer of a long chain aliphatic tertiary amine; and (b) a heat-sealable skin layer comprising a polyolefin of comparatively low stereoregularity on at least one surface of (a) said polyolefin being selected from the group consisting of (1) a random copolymer of propylene with ethylene and (2) a copolymer of propylene with ethylene and butene-1, said skin layer containing a combination of finely divided silica and a silicon oil; said skin layer being of a thickness less than about 0.8 microns.

* * * * *